(12) United States Patent
Hayashi

(10) Patent No.: US 11,104,184 B2
(45) Date of Patent: Aug. 31, 2021

(54) TIRE

(71) Applicant: BRIDGESTONE CORPORATION, Tokyo (JP)

(72) Inventor: Shintaro Hayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 381 days.

(21) Appl. No.: 16/069,063

(22) PCT Filed: Nov. 25, 2016

(86) PCT No.: PCT/JP2016/085008
§ 371 (c)(1),
(2) Date: Jul. 10, 2018

(87) PCT Pub. No.: WO2017/122433
PCT Pub. Date: Jul. 20, 2017

(65) Prior Publication Data
US 2019/0001753 A1    Jan. 3, 2019

(30) Foreign Application Priority Data

Jan. 13, 2016   (JP) .............................. JP2016-004510

(51) Int. Cl.
*B60C 11/04*    (2006.01)
*B60C 11/12*    (2006.01)
(Continued)

(52) U.S. Cl.
CPC .............. *B60C 11/04* (2013.01); *B60C 11/03* (2013.01); *B60C 11/0304* (2013.01);
(Continued)

(58) Field of Classification Search
CPC . B60C 11/04; B60C 11/1204; B60C 11/1384; B60C 11/0383
See application file for complete search history.

(56) References Cited

U.S. PATENT DOCUMENTS

2007/0151646 A1    7/2007    Ito
2008/0000564 A1    1/2008    Mukai
(Continued)

FOREIGN PATENT DOCUMENTS

CN         1990283 A      7/2007
CN       101096170 A      1/2008
(Continued)

OTHER PUBLICATIONS

Communication dated Dec. 10, 2018, from the European Patent Office in counterpart European Application No. 16885036.0.
(Continued)

*Primary Examiner* — Jacob T Minskey
*Assistant Examiner* — Virak Nguon
(74) *Attorney, Agent, or Firm* — Sughrue Mion, PLLC

(57) ABSTRACT

A tire has three or more circumferential direction main grooves, a first land portion and a second land portion that are partitioned by the circumferential direction main grooves, first sipes that are provided in the first land portion, and that have a bend portion protruding in the tire circumferential direction, and whose two ends communicate respectively with the circumferential direction main grooves, second sipes that are provided in the second land portion on a virtual extension of the first sipes, and whose two ends communicate respectively with the circumferential direction main grooves, and first terminal grooves that are provided in the first land portion between first sipes, that are positioned on an outer side in a tire width direction of the first land portion and communicate with the circumferential direction main grooves, and that terminate at a position further to the outer side in the tire width direction than a position in the tire width direction of a distal end of the bend portion, wherein angle portions on an acute angle side (Continued)

relative to the tire circumferential direction of the first land portion facing the first sipes are chamfered.

13 Claims, 4 Drawing Sheets

(51) Int. Cl.
    *B60C 11/03*     (2006.01)
    *B60C 11/13*     (2006.01)

(52) U.S. Cl.
    CPC .......... *B60C 11/0306* (2013.01); *B60C 11/12* (2013.01); *B60C 11/1204* (2013.01); *B60C 11/1384* (2013.01); *B60C 2011/0344* (2013.01); *B60C 2011/0372* (2013.01); *B60C 2011/0381* (2013.01); *B60C 2011/0383* (2013.01); *B60C 2011/1209* (2013.01); *B60C 2011/1213* (2013.01)

(56) References Cited

U.S. PATENT DOCUMENTS

| | | | |
|---|---|---|---|
| 2010/0243120 A1 | 9/2010 | Kiwaki | |
| 2014/0283967 A1 | 9/2014 | Inoue | |
| 2015/0210121 A1* | 7/2015 | Sanae | B60C 11/1204 152/209.8 |
| 2015/0231928 A1* | 8/2015 | Sato | B60C 11/0304 152/209.18 |
| 2016/0152090 A1* | 6/2016 | Takemoto | B60C 11/0306 152/209.24 |

FOREIGN PATENT DOCUMENTS

| | | | | |
|---|---|---|---|---|
| CN | 101827716 A | | 9/2010 | |
| CN | 104057785 A | | 9/2014 | |
| CN | 104859378 A | | 8/2015 | |
| EP | 1995080 A2 | | 11/2008 | |
| EP | 2899041 A1 | | 7/2015 | |
| JP | 1-215603 A | | 8/1989 | |
| JP | 05-229315 A | | 9/1993 | |
| JP | 655912 A | | 3/1994 | |
| JP | 717130 B2 | | 3/1995 | |
| JP | 2002-326506 A | | 11/2002 | |
| JP | 2003-063212 A | | 3/2003 | |
| JP | 2003063212 A | * | 3/2003 | ........... B60C 11/047 |
| JP | 2003-159910 A | | 6/2003 | |
| JP | 2003-159911 A | | 6/2003 | |
| JP | 2004217120 A | | 8/2004 | |
| JP | 2006-264455 A | | 10/2006 | |
| JP | 2007-112217 A | | 5/2007 | |
| JP | 2007176287 A | | 7/2007 | |
| JP | 2009-214761 A | | 9/2009 | |
| JP | 2012-140091 A | | 7/2012 | |
| JP | 2013-006574 A | | 1/2013 | |
| JP | 2014-181021 A | | 9/2014 | |
| JP | 2014-205459 A | | 10/2014 | |
| JP | 2015-231812 A | | 12/2015 | |

OTHER PUBLICATIONS

Communication dated Oct. 21, 2019, from the State Intellectual Property Office of the P.R.C in application No. 201680078676X.
International Search Report for PCT/JP2016/085008, dated Dec. 27, 2016.

\* cited by examiner

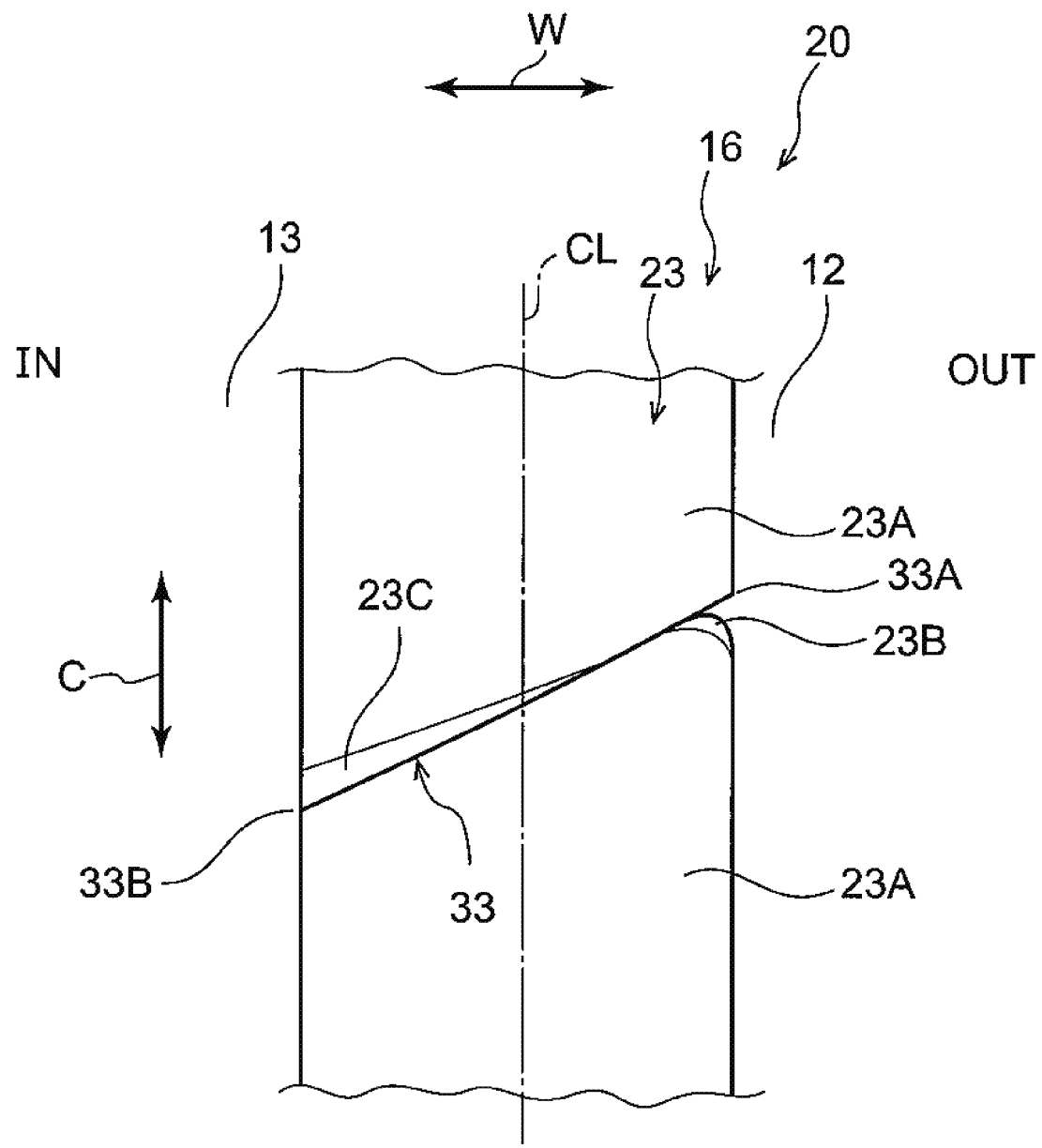

TIRE

CROSS REFERENCE TO RELATED APPLICATIONS

This application is a National Stage of International Application No. PCT/JP2016/085008 filed Nov. 25, 2016, claiming priority based on Patent Japanese Application No. 2016-004510 filed Jan. 13, 2016.

TECHNICAL FIELD

The present disclosure relates to a tire.

BACKGROUND ART

Technology is disclosed in Japanese Patent Application Laid-Open (JP-A) No. 2014-205459 in which sipes are disposed on a tread in order to improve braking performance on wet road surfaces.

SUMMARY OF THE INVENTION

Technical Problem

However, in the aforementioned conventional example no particular consideration is given to running noise.

It is an object of the present disclosure to achieve an improved wet performance and reduced running noise in a tire.

Solution to the Problem

A tire according to a first aspect has three or more circumferential direction main grooves that are provided in a tread and extend in a tire circumferential direction, a first land portion that is provided in the tread and is partitioned by the circumferential direction main grooves, a second land portion that is provided in the tread and is partitioned by the circumferential direction main grooves, first sipes, a plurality of which are provided in the first land portion, that have a bend portion protruding in the tire circumferential direction, and whose two ends communicate respectively with the circumferential direction main grooves that partition the first land portion, second sipes that are provided in the second land portion on a virtual extension of the first sipes, and whose two ends communicate respectively with the circumferential direction main grooves that partition the second land portion, and first terminal grooves that are provided in the first land portion between first sipes that are mutually adjacent in the tire circumferential direction, that are positioned on an outer side in a tire width direction of the first land portion and communicate with the circumferential direction main grooves that partition the first land portion, and that extend towards a center side in the width direction of the first land portion and terminate at a position further to the outer side in the tire width direction than a position in the tire width direction of a distal end of the bend portion, wherein angle portions on an acute angle side relative to the tire circumferential direction of the first land portion facing the first sipes are chamfered.

In this tire, because the first sipes provided in the first land portion have a bend portion, the sipe volume is greater than in sipes which do not have a bend portion, so that the water absorption amount of the first sipes on a wet road surface is greater. Because both ends of the first sipes communicate respectively with the circumferential direction main grooves that partition the first land portion, water discharge from the first sipes into the respective circumferential direction main grooves is promoted. Furthermore, because the second sipes are provided in the second land portion on a virtual extension of the first sipes, so that both ends of the second sipes communicate respectively with the circumferential direction main grooves that partition the second land portion, water discharge from the second sipes into the respective circumferential direction main grooves is also promoted. Accordingly, the braking performance on a wet road surface is improved.

Furthermore, the first terminal grooves are provided in the first land portion. These first terminal grooves are positioned on the outer side in the tire width direction of the first land portion, and communicate with the circumferential direction main groove that partitions the first land portion, and extend towards the center side in the width direction of the first land portion, and then terminate at a position further to the outer side in the tire width direction than the position in the tire width direction of the distal end of the bend portion. As a result, water drainage is improved, and the compression rigidity of the blocks which are partitioned by the first sipes is appropriately uniformized. This contributes to a uniformization of the compression rigidity of the entire tread. Accordingly, axial force variation in the up-down direction while a vehicle is running is suppressed. Moreover, because the second sipes are disposed on a virtual extension of the first sipes, the first sipes and the second sipes have mutually different ground contact timings. Because of this, running noise is reduced.

Moreover, in the first sipes, because the angle portions on the acute angle side relative to the tire circumferential direction are chamfered, any curling deformation caused by a deterioration in the rigidity of these acute angle-side angle portions is suppressed.

A second aspect of the present disclosure is the tire according to the first aspect further includes second terminal grooves that are provided in the second land portion between second sipes that are mutually adjacent in the tire circumferential direction, that these second terminal grooves communicate with the circumferential direction main grooves that partition the second land portion, and extend towards a center side in the width direction of the second land portion and terminate within the second land portion.

In this tire, the second terminal grooves are provided in the second land portion. These second terminal grooves communicate with the circumferential direction main groove that partitions the second land portion, and extend towards the center side in the width direction of the second land portion, and then terminate inside the second land portion. As a result, because the compression rigidity of the blocks which are partitioned by the second sipes is uniformized, running noise is reduced.

A third aspect of the present disclosure is the tire according to the first or second aspects in which the distal end of the bend portions is located within a range of 10 to 25% of a width of the first land portion on the outer side in the width direction of the first land portion from a center in the width direction of the first land portion.

In this tire, because the position of the distal end of each bend portion is appropriately set, the blocks on either side in the tire circumferential direction of each first sipe are able to support each other in the tire width direction. As a result, a balance can be achieved between the block rigidity and the water discharge performance. If the distal end of the bend portion is too close to the circumferential direction main grooves, it becomes difficult for the blocks on both sides of the first sipes in the tire circumferential direction to support each other.

A fourth aspect of the present disclosure is the tire according to any one of the first through third aspects in which positions of the two end portions of the first sipes are mutually different from each other in the tire circumferential direction, and a distance in the tire circumferential direction between the two end portions is within a range of 5 to 25% of a width of the first land portion.

In this tire, because the distance in the tire circumferential direction between the two end portions of the first sipes is appropriately set, steering stability is ensured. If the distance falls outside the numerical range, the block rigidity is reduced and steering stability deteriorates.

Advantageous Effects of the Invention

According to the tire of the present disclosure, the excellent effects are obtained that it is possible to achieve an improved wet performance and a reduction in running noise.

BRIEF DESCRIPTION OF THE DRAWINGS

FIG. 4 is an enlarged plan view showing a third sipe in the second exemplary embodiment.

DESCRIPTION OF THE EMBODIMENTS

Figure 1:
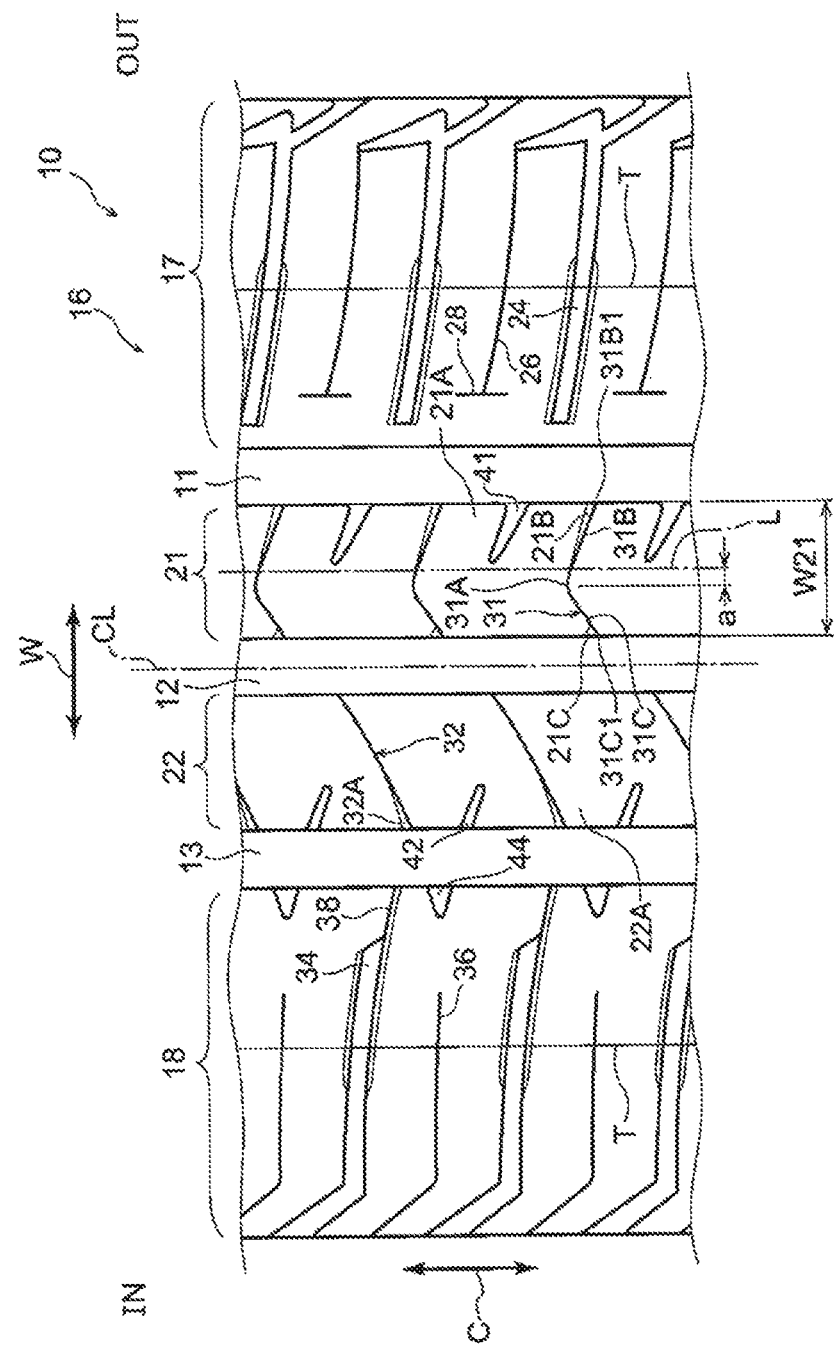
FIG. 1 is a plan view showing a tread pattern of a tire according to a first exemplary embodiment.

Hereinafter, embodiments for implementing the present disclosure will be described based on the drawings. The method used to measure the dimensions of each portion is described in the 2015 edition of the YEAR BOOK published by JATMA (Japan Automobile Tyre Manufacturers Association, Inc.). In the drawings, a direction indicated by an arrow C is a tire circumferential direction, and a direction indicated by an arrow W is a tire width direction. The tire width direction is a direction that is parallel with the tire rotation axis. The tire width direction may also be referred to instead as the tire axial direction. Moreover, in the drawings, OUT indicates an outer side of a tire fitted on a vehicle, while IN indicates an inner side of a tire fitted on a vehicle.

First Exemplary Embodiment

In FIG. 1, a tire 10 according to the present exemplary embodiment is, for example, a pneumatic tire, and has a specific orientation when the tire is fitted on a vehicle.

The tire 10 has circumferential direction main grooves 11, 12, and 13, a first land portion 21, a second land portion 22, first sipes 31, second sipes 32, first terminal grooves 41, and second terminal grooves 42.

For example, the three circumferential direction main grooves 11, 12, and 13 are provided in a tread 16, and extend in a tire circumferential direction. The circumferential direction main groove 12 is provided in a central portion in the tire width direction which includes a tire equatorial plane CL. In the tire width direction, the circumferential direction main groove 11 is provided on one side of the circumferential direction main groove 12, while the circumferential direction main groove 13 is provided on another side of the circumferential direction main groove 12.

The first land portion 21 is provided in the tread 16, and is partitioned by the circumferential direction main grooves 11 and 12. The second land portion 22 is provided in the tread 16, and is partitioned by the circumferential direction main grooves 12 and 13, and is adjacent to the first land portion 21 so as to sandwich the tire equatorial plane CL. In the tire circumferential direction, the first land portion 21 is partitioned by the first sipes 31 and the second land portion is partitioned by the second sipes 32, however, the overall shape of each of these land portions is formed as a rib shape which is continuous in the tire circumferential direction. Shoulder land portions 17 and 18 are provided respectively on both sides in the tire width direction of the circumferential direction main grooves 11 and 13. Note that sipes are cuts that close up when in contact with the ground.

In FIG. 1, a plurality of the first sipes 31 are provided in the first land portion 21, and both ends thereof communicate respectively with the circumferential direction main grooves 11 and 12 that partition the first land portion 21. These first sipes 31 have a bend portion 31A that protrudes in the tire circumferential direction.

Figure 2:
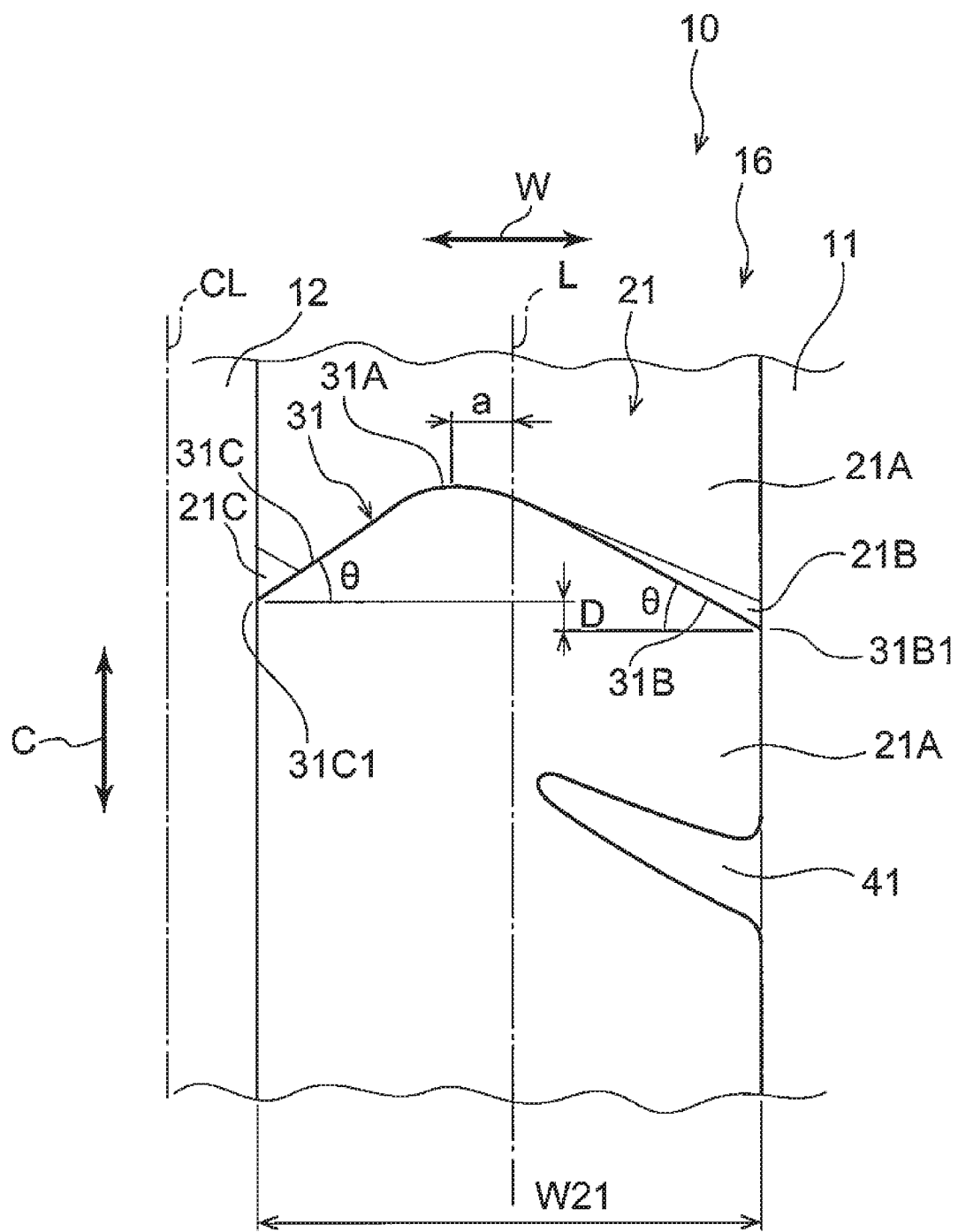
FIG. 2 is an enlarged plan view showing a first sipe and a first terminal groove in the first exemplary embodiment.

As is shown in FIG. 2, in the first sipes 31, rectilinear portions 31B and 31C continue on respectively from both sides of the bend portion 31A. By forming both sides of the bend portion 31A in a rectilinear shape, molding costs can be reduced. An end portion 31B1 of each rectilinear portion 31B that is located on the opposite side from the bend portion 31A communicates with the circumferential direction main groove 11. Additionally, an end portion 31C1 of each rectilinear portion 31C that is located on the opposite side (i.e., on the tire equatorial plane CL side) from the bend portion 31A communicates with the circumferential direction main groove 12.

The first land portion 21 is partitioned by the first sipes 31 into a plurality of blocks 21A that extend in a row in the tire circumferential direction. Angle portions 21B on an acute angle side relative to the tire circumferential direction of the first land portion 21 that face the first sipes 31 are chamfered. Specifically, chamfers are formed respectively, for example, on portions facing the rectilinear portions 31B of the first sipes 31, in particular, on the angle portions 21B on the acute angle side of the blocks 21A including the end portions 31B1 thereof, and on portions facing the rectilinear portions 31C of the first sipes 31, in particular, on angle portions 21C on the acute angle side of the blocks 21A including the end portions 31C1 thereof. Here, the baseline for these acute angles is the tire circumferential direction. The end portions 31C1 of the rectilinear portions 31C of the first sipes 31 are the portions where the first sipes 31 communicate with the circumferential direction main groove 12 which contains the tire equatorial plane CL, and portions of the first sipes 31 located on the tire equatorial plane CL side are also chamfered. When viewing the tread in plan view, the angle portions 21B and 21C on the acute angle side are each chamfered, for example, in a triangular shape.

The amount of chamfering of the portions of the first land portion 21 that face the first sipes 31 is greater on the opposite side from the tire equatorial plane CL side than on the tire equatorial plane CL side. In other words, the amount of chamfering on the angle portion 21B is greater than on the angle portion 21C.

If the size of the chamfering is considered in terms of the width thereof in the tire circumferential direction when looked at in a tread plan view, the amount of chamfering of the angle portions 21B gradually reduces from the outer side in the width direction of the first land portion 21 towards the inner side in this width direction, so that the amount of chamfering reduces to 0 before reaching bend portion 31A. The chamfering of the angle portions 21C is performed in a more localized manner compared to the angle portions 21B. Note that the size of the chamfering may also be considered in terms of volume after the angle portions (i.e., edges) on the road surface side of the blocks 21A have been removed.

In FIG. 1 and FIG. 2, a distal end of each bend portion 31A is positioned within a range of 10~25% of the width W21 of the first land portion 21 starting from a center L in the width direction of the first land portion 21 towards an outer side in the width direction of the first land portion 21, for example, towards the tire equatorial plane CL side. This means that, in FIG. 1, if a distance in the tire width direction from the center L in the width direction of the first land portion 21 to a distal end of the bend portion 31A is taken as a, then a=(0.10~0.25)×W21. Note that the size of the distance a is not limited to being expressed via this formula.

Positions of the two end portions (i.e., the end portions 31B1 and 31C1) of the first sipes 31 are different from each other in the tire circumferential direction. A distance D in the tire circumferential direction between the two end portions (i.e., the end portions 31B1 and 31C1) is within a range of 5 to 25% of the width W21 of the first land portion 21. In other words, D=(0.05~0.25)×W21. As an example, the end portions 31C1 on the inner side in the tire width direction of the first sipes 31 are positioned further to the bend portion 31A side of the first sipes 31 in the tire circumferential direction than the end portions 31B1 on the outer side in the tire width direction of the first sipes 31. Note that the size of the distance D is not limited to being expressed via this formula.

As is shown in FIG. 2, an angle θ relative to the tire width direction of the rectilinear portions 31B and 31C of the first sipes 31 is within a range of, for example, 20~30°. If this angle θ is smaller than this, the running noise worsens. If, on the other hand, the angle θ is larger than this range, the angle of the chamfering becomes too acute, so that rigidity is reduced and there is a deterioration in steering stability.

In FIG. 1, the second land portion 22 is partitioned by the second sipes 32 into a plurality of blocks 22A that extend in a row in the tire circumferential direction. The second sipes 32 are provided in the second land portion 22 on a virtual line extending from the first sipes 31, and both ends thereof communicate respectively with the circumferential direction main grooves 12 and 13 that partition the second land portion 22. In the blocks 22A, angle portions 32A on the acute angle side, which is on the opposite side from the tire equatorial plane CL, are chamfered. The amount of chamfering of the angle portions 32A gradually reduces from the outer side in the width direction of the second land portion 22 (i.e., the blocks 22A) towards the inner side in this width direction, so that the amount of chamfering reduces to 0 before reaching the center in the width direction of the second land portion 22. Note that the second sipes are formed either in a rectilinear shape or in an arc shape when viewed in a tread plan view.

As is shown in FIG. 1, the first terminal grooves 41 are provided in the first land portion 21 between first sipes 31 that are mutually adjacent in the tire circumferential direction. These first terminal grooves 41 are positioned on the outer side in the tire width direction of the first land portion 21. Here, the outer side in the tire width direction of the first land portion 21 corresponds to the opposite side from the tire equatorial plane CL. Moreover, the first terminal grooves 41 communicate with the circumferential direction main groove 11 that partitions the first land portion 21, and extend, for example, in a direction that follows the rectilinear portions 31B of the first sipes 31 towards the center side in the width direction of the first land portion 21, and then terminate at a position further to the outer side in the tire width direction than a position in the tire width direction of the distal end of the bend portion 31A. In the example shown in the drawings, the first terminal grooves 41 terminate at a position further to the outer side in the tire width direction than the center L in the width direction of the first land portion 21.

If the first terminal grooves 41 are too large, the reduction in the compression rigidity of the blocks is too great, and the running noise worsens. Moreover, if the first terminal grooves 41 are too small, there is no reduction in the compression rigidity of the blocks, and water drainage deteriorates. Accordingly, in order to uniformize the compression rigidity of the blocks, it is desirable that the first terminal grooves 41 terminate within an appropriate range, specifically, at a position further to the outer side in the tire width direction than the position in the tire width direction of the distal end of the bend portion 31A. Note that the structure of the first terminal grooves 41 is not limited to this.

The second terminal grooves 42 are provided in the second land portion 22 between second sipes 32 that are mutually adjacent in the tire circumferential direction. These second terminal grooves 42 are positioned, for example, on the outer side in the tire width direction of the second land portion 22. Here, the outer side in the tire width direction of the second land portion 22 corresponds to the opposite side from the tire equatorial plane CL. Moreover, the second terminal grooves 42 communicate with the circumferential direction main groove 13 that partitions the second land portion 22, and extend, for example, in a direction that intersects the second sipes 32 towards the center side in the width direction of the second land portion 22, and then terminate within the second land portion 22. In the example shown in the drawings, the second terminal grooves 42 terminate, for example, at a position further to the outer side in the tire width direction than the center in the tire width direction of the second land portion 22. Note that the structure of the second terminal grooves 42 is not limited to this.

In FIG. 1, lateral main grooves 24 that extend in the tire width direction, and sipes 26 and 28 are provided in the shoulder land portion 17. The lateral main grooves 24 and the sipes 26 terminate further to the inner side in the tire width direction than a ground contact end T of the tread 16 within the shoulder land portion 17, and do not communicate with the circumferential direction main groove 11. The sipes 26 also terminate by intersecting with the sipes 28 so as to form T-shapes. The sipes 28 are provided intermittently in the tire circumferential direction. The lateral main grooves 24 extend further to the inner side in the tire width direction than the sipes 26. Portions of the shoulder land portion 17 that face the lateral main grooves 24 are appropriately chamfered.

If lateral main grooves 24 that are mutually adjacent in the tire circumferential direction in the shoulder land portion 17 are each virtually extended onto the first land portion 21 side, then the positions of the first sipes 31 are not on these virtual line extensions (not shown in the drawings), but are instead between mutually adjacent virtual line extensions in the tire circumferential direction.

Lateral main grooves 34 that extend in the tire width direction, and sipes 36 are provided in the shoulder land portion 18. The lateral main grooves 34 and the sipes 36 terminate further to the inner side in the tire width direction than a ground contact end T of the tread 16 within the shoulder land portion 18, and do not communicate with the circumferential direction main groove 13. The lateral main grooves 34 extend further to the inner side in the tire width direction than the sipes 36.

Furthermore, notches 44 that appear substantially triangular, for example, in a tread plan view are provided on a virtual extension of the second sipes 32 in an end portion on the circumferential direction main groove 13 side of the shoulder land portion 18. In consideration of the balance of rigidity in the shoulder land portion 18, these notches 44 are provided on the inner side in the tire width direction of the sipes 36, which terminate further to the outer side in the tire width direction than the lateral main grooves 34. The lateral main grooves 34 communicate with the circumferential direction main groove 13 via sipes 38. Portions of the shoulder land portion 18 that face the lateral main grooves 34, and also portions thereof that face the sipes 38 are appropriately chamfered.

(Operation)

The present exemplary embodiment is structured in the manner described above. An operation thereof will now be described. In FIG. 1, in the tire 10 according to the present exemplary embodiment, because the first sipes 31 provided in the first land portion 21 have the bend portion 31A, the sipe volume is greater than in sipes which do not have the bend portion 31A, so that the water absorption amount of the first sipes 31 on a wet road surface is greater. Because both ends of the first sipes 31 communicate respectively with the circumferential direction main grooves 11 and 12 that partition the first land portion 21, water discharge from the first sipes 31 into the circumferential direction main grooves 11 and 12 is promoted. Furthermore, because the second sipes 32 are provided in the second land portion 22 on a virtual extension of the first sipes 31, so that both ends of the second sipes 32 communicate respectively with the circumferential direction main grooves 12 and 13 that partition the second land portion 22, water discharge from the second sipes 32 into the circumferential direction main grooves 12 and 13 is also promoted. Accordingly, the braking performance on wet road surfaces is improved.

Furthermore, the first terminal grooves 41 are provided in the first land portion 21. These first terminal grooves 41 are positioned on the outer side in the tire width direction of the first land portion 21, and communicate with the circumferential direction main groove 11 that partitions the first land portion 21, and extend towards the center side in the width direction of the first land portion 21, and then terminate at a position further to the outer side in the tire width direction than the position in the tire width direction of the distal end of the bend portion 31A. As a result, water drainage is improved, and the compression rigidity of the blocks 21A which are partitioned by the first sipes 31 is appropriately uniformized. This contributes to a uniformization of the compression rigidity of the entire tread. Accordingly, any axial force variation in the up-down direction while a vehicle is running is suppressed. Moreover, because the second sipes 32 are disposed on a virtual extension of the first sipes 31, the first sipes 31 and the second sipes 32 have mutually different ground contact timings. Because of this, running noise is reduced.

Moreover, in the first sipes 31, because the angle portions 21B and 21C on the acute angle side relative to the tire circumferential direction are chamfered, any curling deformation caused by a reduction in the rigidity of these acute angle-side angle portions 21B and 21C is suppressed.

Furthermore, in the present exemplary embodiment, the second terminal grooves 42 are provided in the second land portion 22. These second terminal grooves 42 communicate with the circumferential direction main groove 13 that partitions the second land portion 22, and extend towards the center side in the width direction of the second land portion 22, and then terminate inside the second land portion 22. As a result, because the compression rigidity of the blocks 22A which are partitioned by the second sipes 32 is uniformized, running noise is reduced.

Moreover, in the present exemplary embodiment, because the position of the distal end of the bend portion 31A in the width direction of the first land portion 21 (i.e., the distance a in FIG. 2) is appropriately set, the blocks 21A on either side in the tire circumferential direction of each first sipe 31 are able to support each other in the tire width direction. As a result, a balance can be achieved between the block rigidity and the water discharge performance. If the distal end of the bend portion 31A is too close to the circumferential direction main groove 11 or the circumferential direction main groove 12, it becomes difficult for the blocks 21A on both sides in the tire circumferential direction of the first sipes 31 to support each other.

Furthermore, in the present exemplary embodiment, because the distance D in the tire circumferential direction between the two end portions of the first sipes 31 is appropriately set, steering stability is ensured. If the distance D falls outside the numerical range, the block rigidity is reduced and steering stability is reduced.

Additionally, by disposing the distal end of the bend portions 31A away from the center L in the width direction of the first land portion 21 towards the center side in the tire width direction, block rigidity can be ensured even when the first terminal grooves 41 are disposed on the outer side in the tire width direction of the first land portion 21.

Second Exemplary Embodiment

Figure 3:
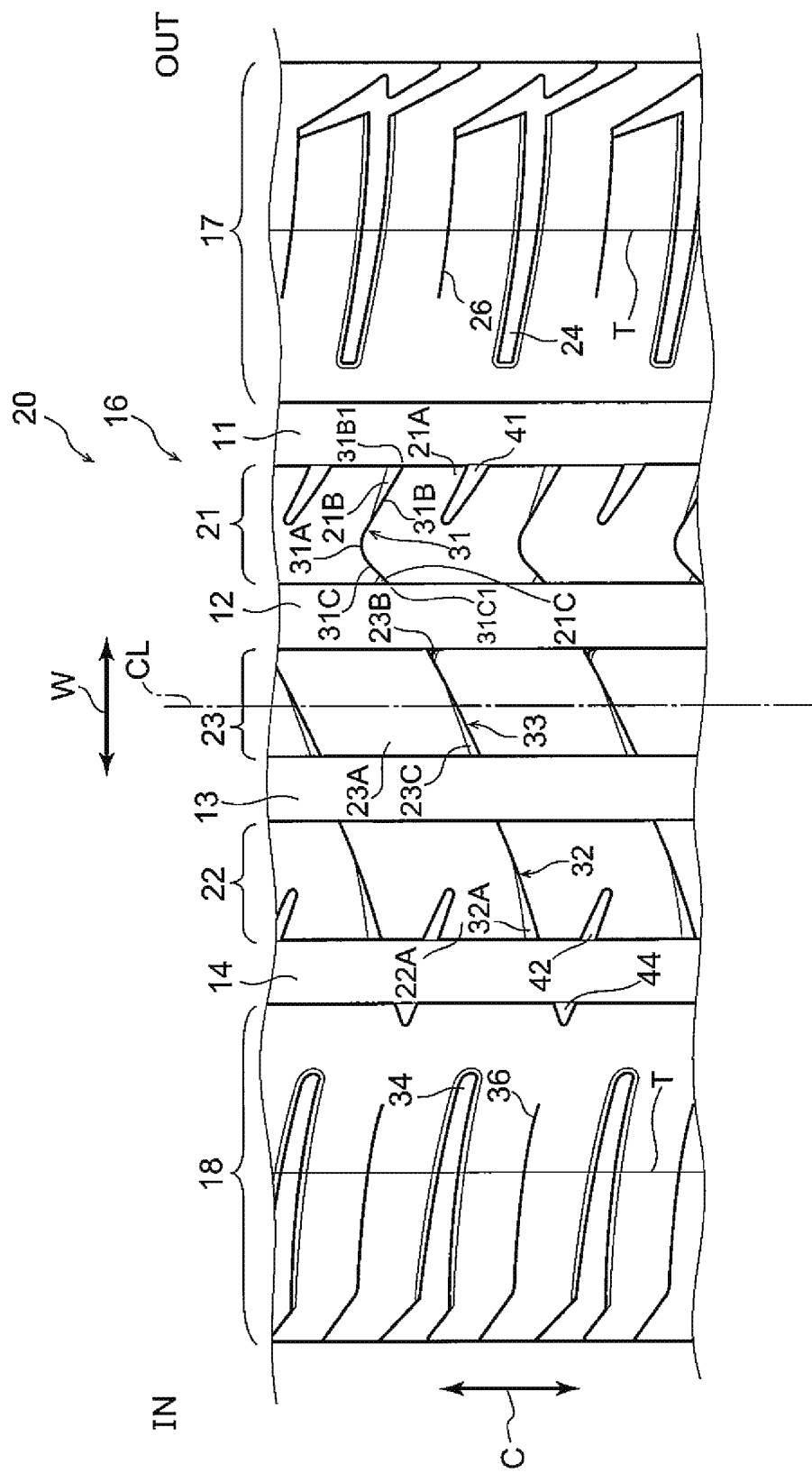
FIG. 3 is a plan view showing a tread pattern of a tire according to a second exemplary embodiment.

In FIG. 3, four circumferential direction main grooves 11, 12, 13, and 14 are provided in the tread 16 of a tire 20 according to the present exemplary embodiment. Unlike the first exemplary embodiment, the circumferential direction main groove 12 does not contain the tire equatorial plane CL. Specifically, the circumferential direction main grooves 11 and 12 are provided on one side in the tire width direction of the tire equatorial plane CL (i.e., on the outer side of a tire fitted on a vehicle), while the circumferential direction main grooves 13 and 14 are provided on the other side in the tire width direction of the tire equatorial plane CL (i.e., on the inner side of a tire fitted on a vehicle).

A third land portion 23 which is partitioned by the circumferential direction main grooves 12 and 13 is provided between the first land portion 21 and the second land portion 23. As is shown in FIG. 4, third sipes 33 are provided in the third land portion 23. End portions 33A of the third sipes 33 which are located on the outer side of a tire fitted on a vehicle communicate with the circumferential direction main groove 12, while end portions 33B thereof which are located on the inner side of a tire fitted on a vehicle communicate with the circumferential direction main groove 13. The third sipes 33 are inclined in the same direction as the rectilinear portions 31C of the first sipes 31, and the second sipes 32 relative to the tire width direction (see FIG. 4). The third sipes 33 may also be disposed on a virtual extension of the rectilinear portions 31C and the second sipes 32.

The third land portion 23 is partitioned by the third sipes 33 into a plurality of blocks 23A. At least a portion of portions of the third land portion 23 that face the third sipes 33 are chamfered. Specifically, angle portions 23B on an acute angle side of the blocks 23A are chamfered in an arc shape when looked at in a tread plan view. These angle portions 23B face the end portions 33A located on the outer side of a tire fitted on a vehicle of the third sipes 33. Additionally, angle portions 23C on the acute angle side of the blocks 23A are chamfered substantially in a triangular shape when looked at in a tread plan view. These angle portions 23C face the end portions 33B located on the inner side of a tire fitted on a vehicle of the third sipes 33. The amount of chamfering of the angle portions 23C becomes gradually less from the inner side of a tire fitted on a vehicle of the third land portion 23 towards the outer side thereof. Here, the baseline for these acute angles is the tire circumferential direction.

The shape of the chamfering on the blocks 23A is asymmetrical in the tire width direction. If the size of the chamfering is considered in terms of the width thereof in the tire circumferential direction when looked at in a tread plan view, the amount of chamfering of the angle portions 23C gradually reduces from the inner side of a tire fitted on a vehicle towards the outer side thereof beyond the tire equatorial plane CL, so that the amount of chamfering reduces to 0 before reaching the angle portions 23B.

Note that the size of the chamfering may also be considered in terms of volume after the angle portions (i.e., edges) on the road surface side of the blocks 23A have been removed. In this case, the amount (i.e., the volume) of chamfering on the angle portions 23B is less than the amount (i.e., the volume) of chamfering on the angle portions 23C.

In the shoulder land portion 17, unlike the first exemplary embodiment, the lateral main grooves 24 extends further to the inner side in the tire width direction than do the sipes 26. In conjunction with this, the sipes 28 of the first exemplary embodiment are not provided in the second exemplary embodiment.

Remaining portions are the same as in the first exemplary embodiment, therefore, these same portions are given the same descriptive symbols in the drawings and a description thereof is omitted.

Operation

The present exemplary embodiment is structured in the manner described above. An operation thereof will now be described. In FIG. 3, in the tire 20 according to the present exemplary embodiment, the third sipes 33 are provided in the third land portion 23 which is located between the first land portion 21 and the second land portion 22, and the two ends of these third sipes 33 communicate with the circumferential direction main grooves 12 and 13 that partition the third land portion 23. Accordingly, on a wet road surface, water absorbed by the third sipes 33 can be discharged to the circumferential direction main grooves 12 and 13.

At least a portion (i.e., the angle portions 23B and 23C on the acute angle side) of portions of the third land portion 23 that face the third sipes 33 are chamfered, and the amount of chamfering of the angle portions 23C gradually reduces from the inner side of a tire fitted on a vehicle of the third land portion 23 towards the outer side thereof beyond the tire equatorial plane CL. Accordingly, on a dry road surface, sufficient ground contact area can be ensured at the same time as any curling deformation of the third land portion 23 is suppressed, and an excellent dry braking performance can be achieved.

Because the portions of the third land portion 23 that easily experience curling deformation are the end portions of the third land portion 23 that are located on the circumferential direction main grooves 12 and 13 sides, chamfering is provided in the vicinity of the portions of the third sipes 33 that communicate with the circumferential direction main grooves 12 and 13 (i.e., the end portions 33A and 33B), specifically, the angle portions 23B and 23C on the acute angle side of the blocks 23A are chamfered.

Other Embodiments

Examples of embodiments of the present disclosure have been described above, however, embodiments of the present disclosure are not limited to these examples, and it should be understood that various modifications and the like may be made to the above-described embodiments insofar as they do not depart from the spirit or scope of the present disclosure.

In the first embodiment, the number of circumferential direction main grooves is three, while in the second embodiment, this number is four, however, the number of circumferential direction main grooves is not particularly limited and may also be five or more.

The amount of chamfering on portions of the first land portion 21 that face the first sipes 31 is larger on the tire equatorial plane CL side than on the opposite side from the tire equatorial plane CL side, however, the amount of the chamfering is not limited to this. Additionally, at least a portion of the portions of the first land portion 21 that face the first sipes 31 is chamfered, however, it is also possible for the first land portion 21 to not be chamfered. The same applies to the chamfering on the second land portion 22.

The second terminal grooves 42 are provided in the second land portion 22, however, a structure in which the second terminal grooves 42 are not provided may also be employed.

Priority is claimed on Japanese Patent Application No. 2016-4510, filed Jan. 13, 2016, the disclosure of which is incorporated herein by reference.

All references, patent applications and technical specifications cited in the present specification are incorporated by reference into the present specification to the same extent as if the individual references, patent applications and technical specifications were specifically and individually recited as being incorporated by reference.

The invention claimed is:

1. A tire comprising:
three or more circumferential direction main grooves that are provided in a tread and extend in a tire circumferential direction;
a first land portion that is provided in the tread and is partitioned by the circumferential direction main grooves;
a second land portion that is provided in the tread and is partitioned by the circumferential direction main grooves;
first sipes, a plurality of which are provided in the first land portion, that have a bend portion protruding in the tire circumferential direction, and whose two ends communicate respectively with the circumferential direction main grooves that partition the first land portion;

second sipes that are provided in the second land portion on a virtual extension of the first sipes, and whose two ends communicate respectively with the circumferential direction main grooves that partition the second land portion; and first terminal grooves that are provided in the first land portion between first sipes that are mutually adjacent in the tire circumferential direction, that are positioned on an outer side in a tire width direction of the first land portion and communicate with one of the circumferential direction main grooves that partitions the first land portion, and that extend towards a center side in the width direction of the first land portion and terminate at a position further to the outer side in the tire width direction than a position in the tire width direction of a distal end of the bend portion, wherein angle portions on an acute angle side relative to the tire circumferential direction of the first land portion facing the first sipes are chamfered;

wherein an amount of chamfering of the angle portions on the acute angle side gradually reduces from an outer side toward the inner side of the first land portion in the tire width direction, so that the amount of chamfering is reduced to 0 before reaching the bend portion;

wherein the circumferential direction main grooves include outermost main grooves in the tire width direction; and further comprising:

shoulder land portions respectively provided on both sides of the outermost circumferential direction main grooves; and notches that are substantially triangular in a tread plan view, the notches being provided on a virtual extension of the second sipes in an end portion on the circumferential direction main groove side of one of the shoulder land portions.

2. The tire according to claim 1, further comprising second terminal grooves that are provided in the second land portion between second sipes that are mutually adjacent in the tire circumferential direction, that communicate with another of the circumferential direction main grooves that partitions the second land portion, and that extend towards a center side in the width direction of the second land portion and terminate within the second land portion.

3. The tire according to claim 1, wherein the distal end of the bend portions is located within a range of 10 to 25% of a width of the first land portion on the outer side in the width direction of the first land portion from a center in the width direction of the first land portion.

4. The tire according to claim 1, wherein:
positions of the two end portions of the first sipes are mutually different from each other in the tire circumferential direction, and
a distance in the tire circumferential direction between the two end portions is within a range of 5 to 25% of a width of the first land portion.

5. The tire according to claim 1, further comprising second terminal grooves that are provided in the second land portion between second sipes that are mutually adjacent in the tire circumferential direction, that communicate with the circumferential direction main grooves that partition the second land portion, and that extend towards a center side in the width direction of the second land portion and terminate within the second land portion;
wherein the distal end of the bend portions is located within a range of 10 to 25% of a width of the first land portion on the outer side in the width direction of the first land portion from a center in the width direction of the first land portion.

6. The tire according to claim 1, further comprising second terminal grooves that are provided in the second land portion between second sipes that are mutually adjacent in the tire circumferential direction, that communicate with the circumferential direction main grooves that partition the second land portion, and that extend towards a center side in the width direction of the second land portion and terminate within the second land portion;
wherein:
positions of the two end portions of the first sipes are mutually different from each other in the tire circumferential direction, and
a distance in the tire circumferential direction between the two end portions is within a range of 5 to 25% of a width of the first land portion.

7. The tire according to claim 1, wherein the distal end of the bend portions is located within a range of 10 to 25% of a width of the first land portion on the outer side in the width direction of the first land portion from a center in the width direction of the first land portion;
wherein:
positions of the two end portions of the first sipes are mutually different from each other in the tire circumferential direction, and
a distance in the tire circumferential direction between the two end portions is within a range of 5 to 25% of a width of the first land portion.

8. The tire according to claim 1, further comprising second terminal grooves that are provided in the second land portion between second sipes that are mutually adjacent in the tire circumferential direction, that communicate with the circumferential direction main grooves that partition the second land portion, and that extend towards a center side in the width direction of the second land portion and terminate within the second land portion;
wherein the distal end of the bend portions is located within a range of 10 to 25% of a width of the first land portion on the outer side in the width direction of the first land portion from a center in the width direction of the first land portion;
wherein:
positions of the two end portions of the first sipes are mutually different from each other in the tire circumferential direction, and
a distance in the tire circumferential direction between the two end portions is within a range of 5 to 25% of a width of the first land portion.

9. The tire according to claim 1, wherein
the second land portion is partitioned by the second sipes into a plurality of blocks that extend in a row in the tire circumferential direction;
in the plurality of blocks, other angle portions are provided on an acute angle side facing the second sipes, the other angle portions are provided on a side of the second land portion opposite from a tire equatorial plane; and
the other angle portions are chamfered, and an amount of chamfering of the other angle portions gradually reduces from an outer side toward the inner side of the second land portion in the tire width direction, so that the amount of chamfering is reduced to 0 before reaching a center in the width direction of the second land portion.

10. The tire according to claim 1, wherein the notches are also positioned on virtual lines respectively extending from the second terminal grooves.

11. The tire according to claim 1, wherein the amount of chamfering of the angle portions on a side opposite from a tire equatorial plane is greater than the amount of chamfering of the angle portions on the tire equatorial plane side.

12. The tire according to claim 1, wherein the first sipes include rectilinear portions, and an angle of the rectilinear portions relative to the tire width direction is within a range of 20 to 30°.

13. The tire according to claim 1, wherein the second sipes are provided in the second land portion on a virtual line extending from the first sipes, and both ends of the second sipes communicate respectively with the circumferential direction main grooves that partition the second land portion.

* * * * *